United States Patent
Bivens et al.

(10) Patent No.: US 11,249,945 B2
(45) Date of Patent: Feb. 15, 2022

(54) COGNITIVE DATA DESCRIPTORS

(71) Applicant: International Business Machines Corporation, Armonk, NY (US)

(72) Inventors: John A. Bivens, Ossining, NY (US); Jozef Cota, Yorktown Heighls, NY (US); James R. Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 738 days.

(21) Appl. No.: 15/842,582

(22) Filed: Dec. 14, 2017

(65) Prior Publication Data

US 2019/0188281 A1    Jun. 20, 2019

(51) Int. Cl.
*G06F 16/14* (2019.01)
*G06F 3/0484* (2013.01)

(52) U.S. Cl.
CPC .......... *G06F 16/156* (2019.01); *G06F 16/148* (2019.01); *G06F 3/04847* (2013.01)

(58) Field of Classification Search
CPC ... G06F 16/156; G06F 16/148; G06F 3/04847
See application file for complete search history.

(56) References Cited

U.S. PATENT DOCUMENTS

| | | | |
|---|---|---|---|
| 6,278,455 B1 | 8/2001 | Baker | |
| 7,233,684 B2* | 6/2007 | Fedorovskaya | G06K 9/6293 382/118 |
| 7,992,103 B2 | 8/2011 | Gusmorino et al. | |
| 8,868,574 B2 | 10/2014 | Kiang et al. | |
| 2005/0010553 A1* | 1/2005 | Liu | G06F 16/583 |
| 2005/0144162 A1 | 6/2005 | Liang | |
| 2006/0047656 A1* | 3/2006 | Dehlinger | G06F 16/38 |
| 2006/0206495 A1* | 9/2006 | Van Gageldonk | G06F 16/48 |
| 2008/0104040 A1* | 5/2008 | Ramakrishna | G06F 16/951 |
| 2008/0235284 A1* | 9/2008 | Aarts | A61B 5/0533 |
| 2008/0253695 A1* | 10/2008 | Sano | A61B 5/165 382/305 |
| 2010/0086204 A1* | 4/2010 | Lessing | G06F 16/58 382/165 |
| 2014/0192229 A1* | 7/2014 | Kim | H04N 1/32128 348/231.3 |

(Continued)

FOREIGN PATENT DOCUMENTS

WO    2016004440 A1    1/2016

*Primary Examiner* — Tamara T Kyle
*Assistant Examiner* — Lahcen Ennaji
(74) *Attorney, Agent, or Firm* — Robert R. Aragona (57) ABSTRACT

An embodiment of the invention includes a method of managing data items based on context, where markers are associated with the data items, where the markers indicate states of authors of the data items when the data items were created. The markers can be associated with the data items by a processor. A query for a data item can be received from a user via an interface, where the query can include one or more markers indicative of the state of an author of the data item when the data item was created. The results of the query can be displayed, where the results of the query can include data items that are associated with the marker(s).

18 Claims, 5 Drawing Sheets (56) References Cited

U.S. PATENT DOCUMENTS

| | | | |
|---|---|---|---|
| 2014/0372467 A1* | 12/2014 | Locker | G06F 16/24575 |
| | | | 707/766 |
| 2015/0161206 A1 | 6/2015 | Waltermann et al. | |
| 2017/0098152 A1* | 4/2017 | Kerr | G06F 3/04842 |
| 2017/0351768 A1* | 12/2017 | Nagao | A61B 5/6898 |
| 2018/0075876 A1* | 3/2018 | Chintalapoodi | G11B 27/034 |
| 2018/0089241 A1* | 3/2018 | Mendels | G06F 16/93 |

\* cited by examiner

COGNITIVE DATA DESCRIPTORS

TECHNICAL FIELD

The present invention relates to systems, methods, and computer program products for cognitive data descriptors.

SUMMARY OF THE INVENTION

An embodiment of the invention provides a method of managing data items based on context, where a processor associates markers with the data items. The markers can indicate one or more bodily states of the authors of the data items when the data items were being accessed by the authors. The bodily states of the authors can include locations of the author's bodies when the data items were being accessed by the author. The markers can be automatically associated with the data items without input from the author indicating the bodily state of the author. A query for a data item can be received from a user via an interface, where the query can include one or more markers indicative of the bodily state of the author of the data item when the data item was being accessed by the author. Results of the query can be displayed and can include data items that are associated with the marker.

An embodiment of the invention provides a method including receiving a query for a file classification from a user to be found in a file collection; searching the file collection in response to the received query; assembling the search results to the user where the search results include a list of files each having at least one marker including at least one state of at least one individual associated with the respective file and/or at least one item of metadata; analyzing the at least one marker for at least a largest variance in the at least one marker; applying the at least largest variance against the search results to locate at least two categories of files within the search results; and determining at least one commonality shared within each category of files.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Today, data is typically generated and stored in a file system using a fixed set of descriptors of the data, which can include, for example, the file name, the time of creation, the size of the file, and/or the file extension/type. Searching allows an individual to sort and find data items based on these descriptors, as well as look into the data for specific text.

At least one embodiment of the invention provides a system that uses cognitive and contextual data items for file system storage, analysis, querying, and searching to allow an individual using natural language queries and an intuitive interface to find and analyze data items created by the individual. These additional dimensions of file descriptor association can include GPS coordinates, physical activities (e.g., accelerometry, physiological signals), and/or cognitive assessment and state categories (e.g., arousal level, agitation, focus of attention, etc.). This can allow a search for data items to be conducted not only based on file contents, but the personal context in which the file was created. Also, individuals can learn about how the context influences the qualities of the data created, such that optimization of work and productivity can become possible.

The system can add files descriptors (also referred to herein as "markers") to data items created by an individual which encapsulates the state of the individual at the moment of creation. Specifically, this state can include cognitive states, physiological states, body posture, and physical location information. In addition, a history of each of these measures can be included in the file descriptor annotation.

Figure 1:
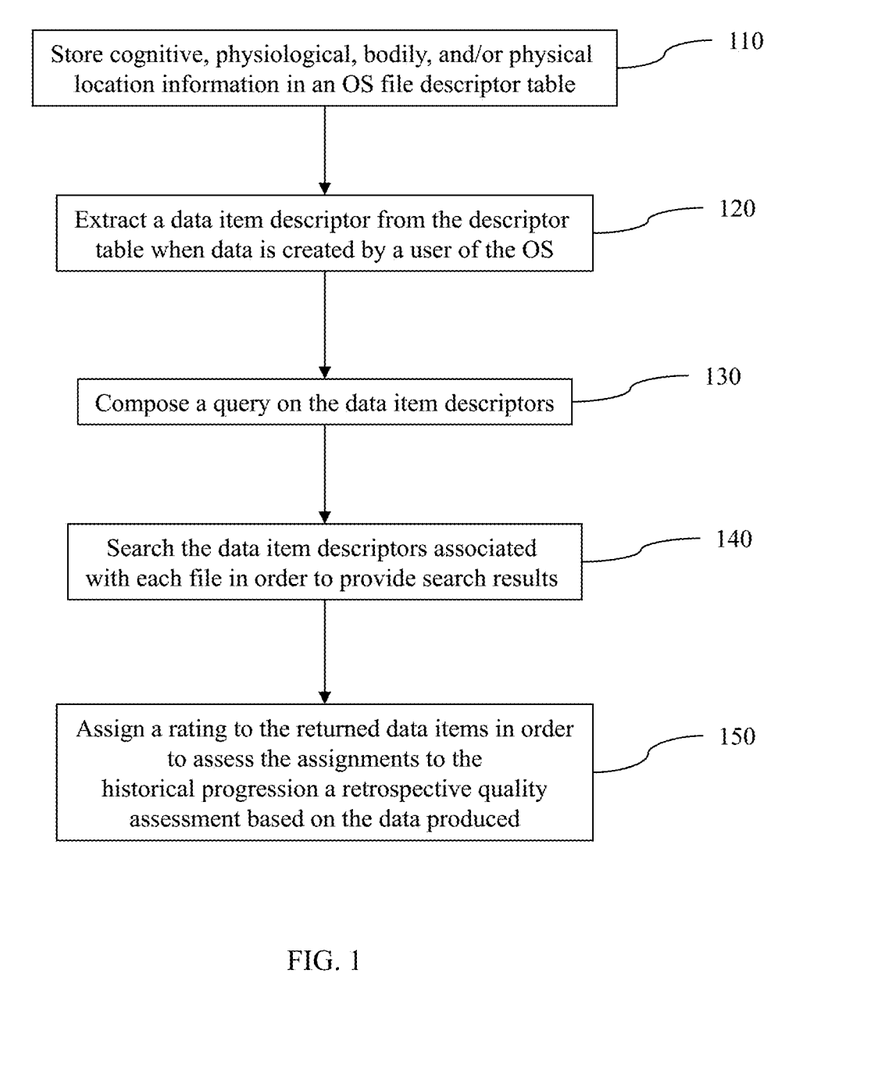
FIG. 1 is a flow diagram illustrating a method for cognitive data descriptors according to an embodiment of the invention.

FIG. 1 is a flow diagram illustrating a method for cognitive data descriptors according to an embodiment of the invention. Cognitive, physiological, bodily, and/or physical location information can be stored in an operating system (OS) file descriptor table 110. This table can make use of cloud storage and block chain. When data is created by a user of the OS, a data item descriptor can be extracted from the descriptor table, comprising specifics about the current context of data creation, as well as a historical context 120.

An individual can compose a query on these data item descriptors which may include any or all of the following: any combination of the specific contextual descriptors collected at the time of data item creation; a description of the linear historical progression of contexts leading up to the data item creation; and a description of the topological features associated with the historical progression leading up to the data item creation 130. The features may include number of steps, speed of traversal, dwell times, loopiness, etc.

The system can search the data item descriptors associated with each file in order to provide search results 140. The user can assign a rating to the returned data items in order to assess the assignments to the historical progression via a retrospective quality assessment based on the data produced 150. The associations of the markers to the data items can be updated based on the ratings by the user.

Many of the approaches described herein can facilitate the finding of documents and data files, among other benefits. The challenge of finding files is a process that can be quite time consuming. In fact, there are times that users simply "give up" before finding a file from the past. Files may be created in many ways. They may be created by users using office productivity tools. They may be created by programs used by users (e.g. scientific tools), and so forth. Files may be created on phones, tablets, laptops, desktop computers, and servers.

In addition to the aforementioned features, data associated with files (or segments of files) may include the kind of location when the file was created or edited (e.g., coffee shop, airport lounge, home office, work office), etc. In fact, users may recall that they composed the document in a coffee shop and use recollection to help find documents. This is a cognitive aid for file finding and reminiscing about files. Data associated with files (or segments of files) may include weather and ambient conditions (e.g., a user may remember that he was writing a portion of a document while in City X on a very warm day), device type, ambient light, and/or type of keyboard (e.g., virtual glass keyboard, physical keyboard, or voice dictation).

Furthermore, data associated with files (or segments of files) may include distraction level (e.g., the user was toggling among 5 different windows during a half hour period while composing paragraph 27, and picked up his phone once during this period). Metadata associated with multiple authors who worked on the document may be included in the data associated with files (or segments of files). For example, Cliff was in coffee shop when composing paragraph 5, and James was at his work office when composing paragraph 20.

The system can include a graphical user interface (GUI) for users so that they may weigh different parameters for searching. For example, a user is searching for a file she created about 2 years ago, and she recalls that she was nervous and in coffee shop ABC for about 40% of the time the document was composed. She may wish to place slightly more weight, during her search, on the location information then the mood information.

Figure 2:
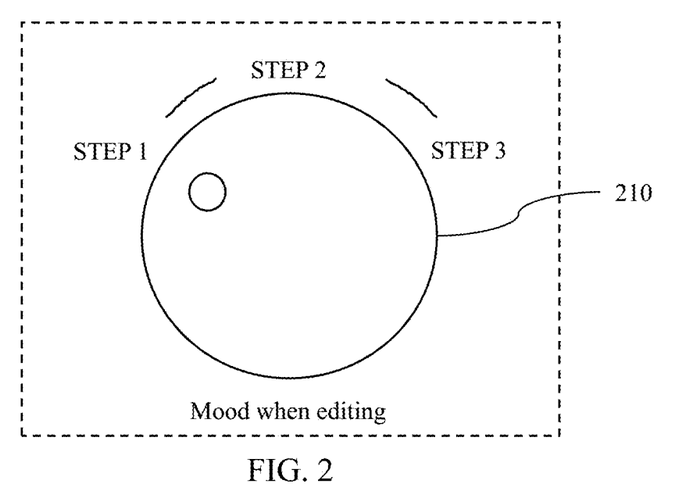
FIG. 2 illustrates a graphical user interface according to an embodiment of the invention.

FIG. 2 illustrates a GUI that is used for searching according to an embodiment of the invention. During a search, the user may wish to weigh "location" strongly, because he recalls being in his home office while composing or creating a file. Although the term "editing" is used in this GUI drawing, it can also simply refer to file creation using many different methods and tools. Mood and cognition, as mentioned, can refer to such aspect as distraction level, feeling tired while editing (and perhaps even having a slower typing speed because of this), and so forth. Some of this information may be specified by a user at the time the document was being composed. For example, if a user is rushing to complete a paper for his boss and he is nervous, he may indicate this (e.g., with a button, via voice, etc.) to facilitate later searchers for the file. Although FIG. 2 illustrates a dial (or knob) 210 as the interface, other virtual items may be used instead such as a slide interfaces 310, 320 illustrated in FIG. 3, a set of radio buttons to select the weighting or a menu list from which the weighting may be selected.

Figure 3:
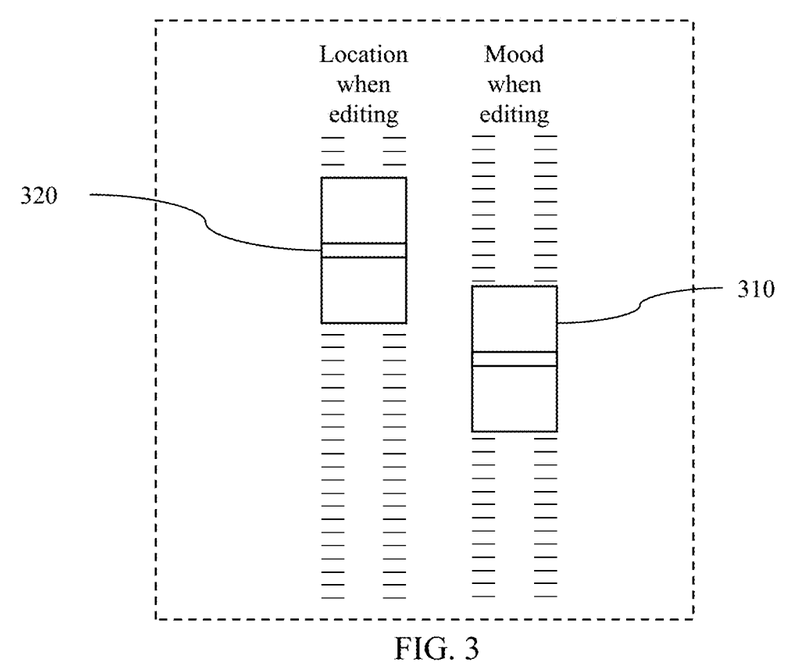
FIG. 3 illustrates a graphical user interface according to another embodiment of the invention.

FIG. 3 illustrates a graphical user interface according to an embodiment of the invention, where the values on the slide bar refer to an "average" for the entire data file, a median, a mode, a range, a variance, etc. For example, different parts of a file (e.g., sentences, sections, chapters, or subroutines in software) may be written at different times, in different places, and in different moods by one or more users. Thus, users may request to find a document that was "mostly composed" in a coffee shop, or a document for which the introduction was composed in a hurry. Although FIG. 3 illustrates a pair of slide interfaces 310, 320, other interfaces may be used in place of the slide interfaces such as the dial possibilities discussed in connection with FIG. 2.

The returned set of possible target documents or data files may be sorted in order of many of the parameters mentioned above. For example, all documents composed in coffee shops or on the beach for "most" of their creation time may appear at the top of the search, and so forth.

Figure 4:
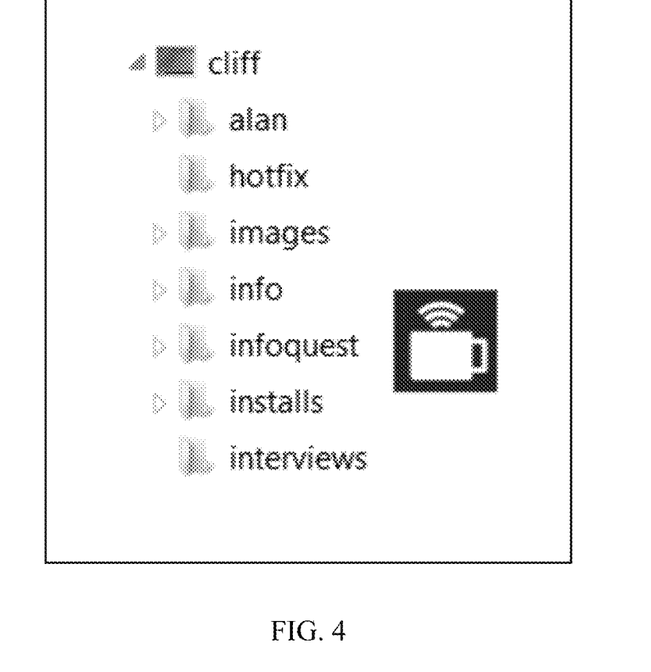
FIG. 4 illustrates a list of files including a marker according to an embodiment of the invention.

During the file search, files and/or folders may bear certain easy to understand markers. For example, as illustrated in FIG. 4, a symbol for a coffee shop with "Wifi available" is positioned next to a folder titled "infoquest." This may mean, for example, that this folder was created while in a coffee shop, or that the majority of files within the folder were created in a coffee shop. Similarly, individual files may have markings for location, emotion, mood, distraction level, typing speed and typing error rate, etc.

Figure 5:
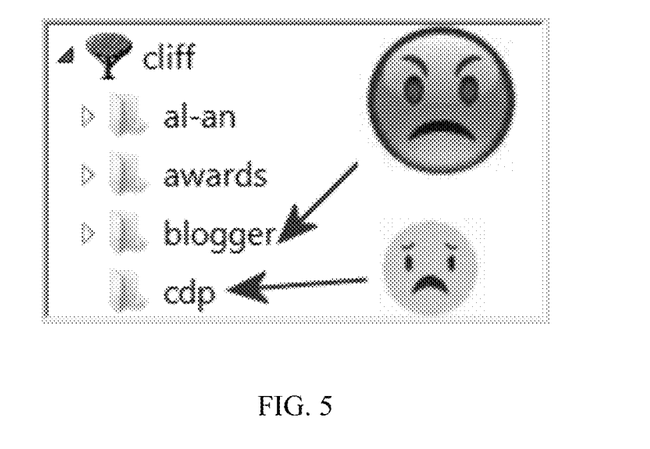
FIG. 5 illustrates a list of files including cognition/mood markers according to an embodiment of the invention.

FIG. 5 illustrates a list of files including cognition/mood markers according to an embodiment of the invention, where color and/or size of the marker can also play a role. Icons may be canned icons provided by a service or tool, or defined or modified by the user. Icons may be added automatically (algorithmically) and/or may be added by users who wish to play a role in "telling" the system how they feel. For example, as illustrated in FIG. 5, a user can label the "blogger" folder with an angry marker and the "cdp" folder with a sad marker. The size difference between the markers can indicate that the angry marker is a stronger emotion.

The frame of the GUI for an application (e.g., a word processor) may display markers indicating moods, locations, etc. corresponding to paragraphs, sections, etc. of a document or data file. For example, if paragraph 7 in a document was created with low distraction on a beach, a beach umbrella may appear to the side of the document in the application. A document or data file may be "sorted" by the aforementioned characteristics. For example, chapters or paragraphs may be temporarily sorted based on location of composition, mood, cognitive features, etc.

Modules may be offered to help make correlations between the type and quality of text typed into documents and the various aforementioned variables relating to setting and cognitive state. As just one example, the Gunning fog index (readability test for English writing) may be computed on documents, or portions of documents, and such correlations made.

Similarly, the Dale/Chall readability formula may be computed:

$$0.4\left[\left(\frac{words}{sentences}\right) + 100\left(\frac{complex\ words}{words}\right)\right]$$

In another embodiment, the Flesch/Kincaid readability test may be computed:

$$206.835 - 1.015\left(\frac{total\ words}{total\ sentences}\right) - 84.6\left(\frac{total\ syllables}{total\ words}\right)$$

Various kinds of errors (and unfixed errors) in text input may be monitored.

The term "document" may refer to emails, instant messages, technical papers composed in a word processor, drawing files, etc. Visual artists may also benefit with files like TIF, JPG, PDF, AI, MPEG, MPG, BMP, Photoshop files, and updated versions of these file types, and the like, and being able to search for them or better understand their creativity in different settings, mindsets, ambient conditions, moods, and the like.

If a file is associated with something for sale (e.g., an artwork, a book, a paper, a technical drawing, a design, a piece of software, etc.), then metadata related to this sale may be added to the file (e.g., income derived from work, sale price, time needed to find a buyer, etc.). If a funding platform is associated with the file, folder, or platform for creative projects (e.g., one or more files associated with a film, music, art, theater, games, comics, design, photography, etc.), then metadata related to the funding platform may be appended (e.g., funding level, pledges of support, etc.). Cognitive and location features may also be used to mark such items.

The system can allow an individual to find data items created under conditions which are more memorable than the data items themselves. Moreover, the system can allow an individual to perform reverse correlation on specific data items and their qualities and the historical contexts and features that led up to the creation of these data items. The system can allow an individual to optimize the creation of new data based on returning to context which were conducive to high quality data creation. In at least one embodiment, the system includes an OS file descriptor table which aggregates cognitive states, physiological states, body posture, and/or physical location information for the purpose of creating data items from a user of the OS, which when a file is created, provides additional features and file descriptors for storage and association with the file. A file search interface of the system can be used to compose queries based on natural language descriptions of contexts under which a file was created. The system can include a historical feature association mechanism for associating a file with a feature of the traversal of context that led to the creation of the file, with the ability to query, search, and perform reverse correlation on the files based on the historical features. An optimization method can be provided for recommending contexts and traversals associated with higher quality data creation by the user. The system also includes a GUI in which files or folders can be marked based on the descriptors.

In at least one embodiment, the system allows for an additional method of using context to gain additional insight into a file collection to be performed. The system includes a set of files that include a variety of file types, such as document files, multimedia files, presentation files, drawing files, photographic files, music files etc. Each of the files has at least one marker associated with the file regarding the at least one state of the at least one individual associated with the file, such as author, subject of the file, editor or reviewer, etc. and/or at least one piece of metadata that in at least one embodiment will include historical markers such as time, date, and location. In at least one embodiment, the at least one state includes at least one bodily state. In at least one embodiment, each file will have a classification of the file that has been assigned by at least one individual where an example is a document code used in a document management system where the code describes the purpose or document type such as correspondence, court filing, office procedures, administrative, personal, vacation, research, great idea, etc. In a further embodiment, one or more files may have multiple classifications assigned to them.

The method begins with receiving a query for a file classification from a user to be found in the file collection. An example of this is all documents classified as being associated with an invention disclosure. This query is used to search the file collection to provide an assembly of search results to the user. In at least one embodiment, the search results include a list of files. Each listed or identified file has associated with it at least one marker.

The at least one state of at least one individual associated with the respective files and the at least one piece of metadata are analyzed for the state or the piece of metadata that provides the largest variance in the at least one marker. For example, the search results for the invention disclosure files provides a variance in states associated with the individual's heart rate. In a further embodiment, multiple variances are determined and used in later steps to learn additional information regarding the files.

The located variance is then applied to the search results to see if there are any categories such as at least two categories of files that share the variance(s) for at least one marker within the search results. For example, the individual's heart rate variance where it is elevated for at least one hour as to being the normal heart rate for the individual is used to divide the invention disclosure files into two categories. Variance is only one such statistic that may be applied to historical recordings of data such as heart rate.

Each category of files is analyzed to determine whether there is a shared aspect or commonality internal to each category of files. For example, invention disclosures rated to be filed were associated with one heart rate while invention disclosures rated to not be file were associated with the other heart rate. This analysis may be performed by examining each state and/or type of metadata for the files in each category looking for something shared between all of the files where the state and/or type of metadata is the same or similar to each other. In a further embodiment, these correlations and statistics may provide insight to the user of different ways to search for similar file classifications to locate a relevant document. In a further embodiment, the at least one commonality is added as at least one state for each respective file.

In at least one embodiment, the method allows for the identification of unrelated criteria to identify new information about the conditions in which the file and/or data associated with the file was created.

Figure 6:
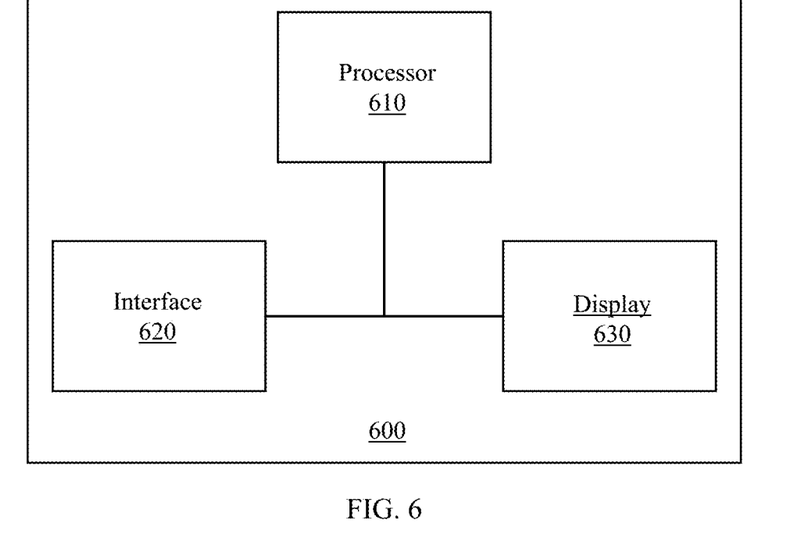
FIG. 6 illustrates a system for cognitive data descriptors according to an embodiment of the invention.
Figure 7:
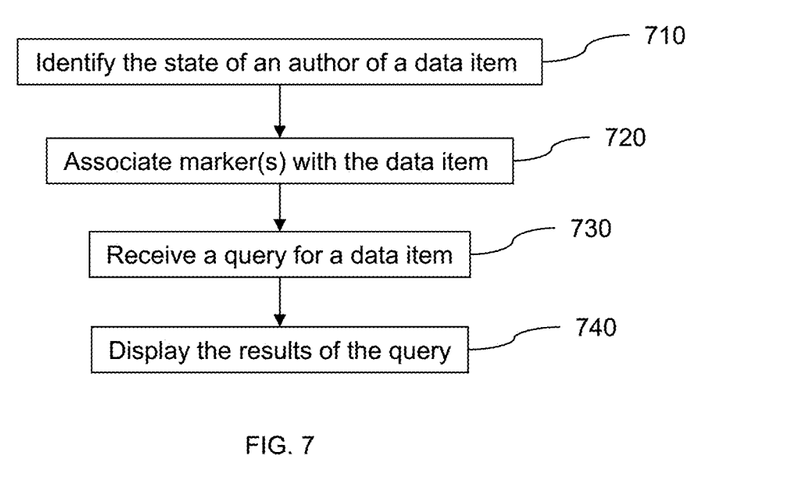
FIG. 7 is a flow diagram illustrating a method for cognitive data descriptors according to an embodiment of the invention.

FIG. 6 illustrates a system 600 for managing data items (also referred to herein as "files" or "documents") based on context according to an embodiment of the invention, wherein the system 600 includes a processor 610, an interface 620, and a display 630. FIG. 7 is a flow diagram illustrating a method of managing data items based on context according to an embodiment of the invention (e.g., using the system 600).

The processor 610 can identify the state of an author of a data item (710). The state of the author can be identified from manual input from the author via an interface and/or from one or more sensors on or proximate to the author.

The state of the author can include GPS coordinates, a city, a street address, a name of a business, and/or a name selected by a user. In at least one embodiment, the state of the author includes one or more moods of the author (e.g., happy, sad, frustrated, angry, bored, anxious, nervous, sleepy, fatigued, excited, etc.), one or more physiological states of the author (e.g., body temperature, posture, limb configuration, muscle tone, muscle movement, respiration rate, measures of digestion, skin conductance, facial expression, EEG, EMG, pupil dilation, spasticity, spasmodicity, and/or heartrate), weather experienced by the author (e.g., sunny, rainy, cloudy, partly cloudy, drizzle, hurricane, snowing, blizzard, etc.), the device type used by the author when the data item was accessed (smart phone, smart watch, smart camera, tablet computer, home computer, work computer, public computer, hotel computer, library computer, etc.), and/or the level of distraction of the author (e.g., distracted, not distracted, moderately distracted, score from 1-10, etc.).

The processor 610 can associate markers with the data items (720), where the markers can indicate states of the authors of the data items when the data items were being accessed by the authors. As used herein, the term "accessed" includes created, edited, revised, modified, and viewed. The association of the markers with the data items can be based on input manually entered into the interface by the authors. For example, an author of a word processing document can tag the document with a marker using a mouse and a drop-down menu, where the marker indicates that the document was revised at the law library at the state university. In another embodiment, the association of the markers with the data items is automatically performed by the processor 610 without input from the authors indicating the states of the authors. For example, when an author of a photograph creates the photograph, the processor 610 automatically associates a marker with the photograph without input from the author indicating the state of the author, where the marker indicates that the photograph was created when the author was angry.

In at least one embodiment, a query for a data item is received from a user (e.g., the author) via the interface 620 (730), where the query includes at least one marker indicative of a state of an author of the data item when the data item was being accessed by the author. As used herein, the term "interface" includes a computer hardware device, such as, for example, a keyboard, a mouse, a microphone, a touchpad, a touchscreen, a joystick, a controller, a camera, a disk drive, an input port, an output port, an antenna, etc. For example, the user is searching for an inventory spreadsheet that she modified when she was angry, so she submits the query "inventory spreadsheet angry" via a keyboard.

The query can include weighted coefficient(s) for the marker(s). For example, an author thinks that he was a little sleepy, moderately nervous, and very frustrated when he created a file, so his query includes the weighted coefficients 0.5, 1.0, and 1.5 for the markers sleepy, nervous, and frustrated, respectively.

In at least one embodiment, the processor 610 associates a historical progression of author states with the data item(s), and the query includes the historical progression of author states. For example, the author remembers that she was initially frustrated when she was editing a document, then she felt sad that she had to miss a party, then she felt happy that she accomplished a goal. The author can include the historical progression marker frustrated-sad-happy in her query.

The results of the query can be displayed on the display 630 (740), where the results of the query include data items that are associated with the marker(s) in the query. As used herein, the term "display" includes a computer hardware device, such as, for example, a monitor or touch screen. The user can enter a rating of one or more search results via the interface 620, where the rating can indicate a retrospective accuracy assessment of the association of the marker with the search result. For example, if a search result is exactly what the user was looking for, he can rate the search result as a 5. If, however, the search result is far from what the user was looking for (e.g., the search result is a photograph created when he was happy when the user was looking for a document he reviewed when he was angry), he can rate the search result as a 0.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
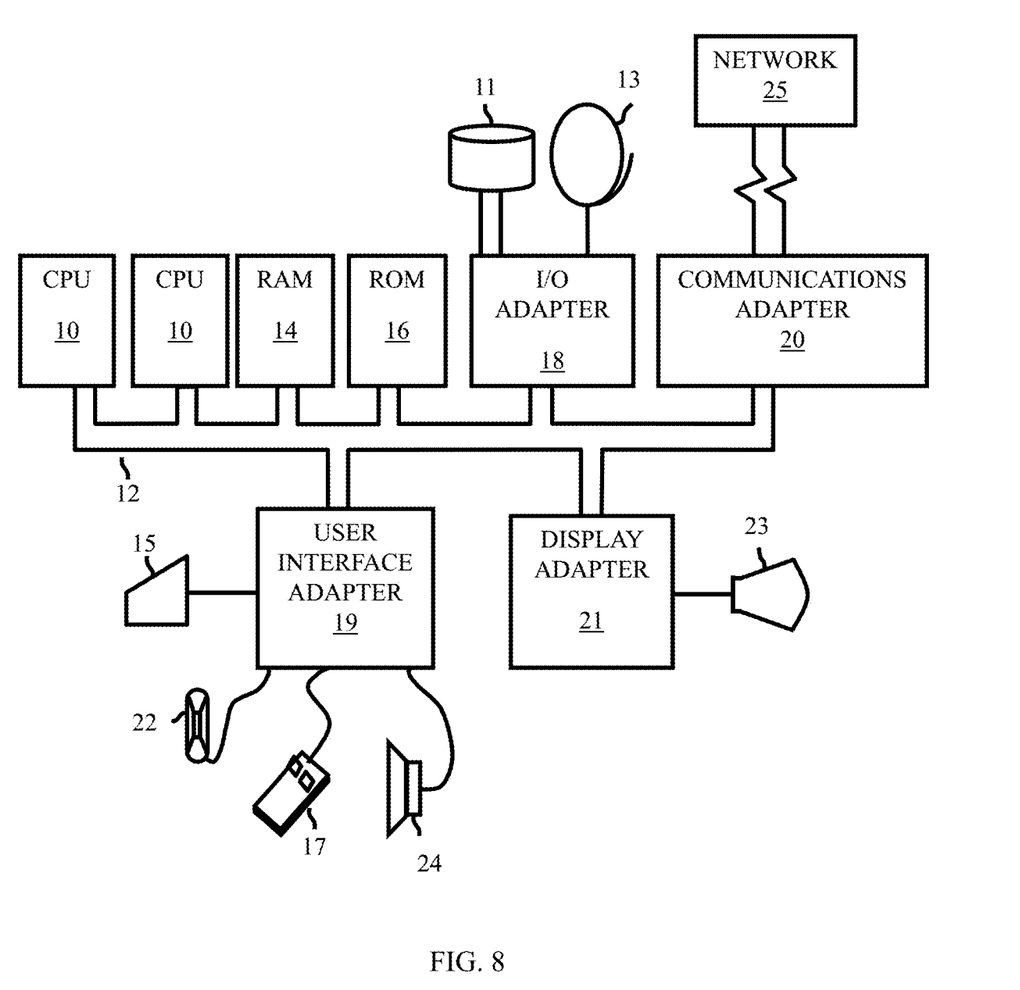
FIG. 8 is a diagram illustrating a computer program product for cognitive data descriptors according to an embodiment of the invention.

Referring now to FIG. 8, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing data items based on context, said method comprising:

associating markers with data items, the markers indicating states of at least one author of the data items when the data items were being accessed by the at least one author, the markers being associated with the data items by a processor, wherein the markers are obtained from an operating system (OS) file descriptor table which aggregatesthe markersfrom a cloud, and wherein the associating of the markers with the data items includes associating a historical progression of author states with at least one of the data items;

receiving a query for a data item from a user via an interface, the query including at least one marker indicative of a state of an author of the data item when the data item was being accessed by the author, wherein the state of the author includes a mood of the author, wherein the user is able to select a searching weight for the at least one marker via a graphical user interface (GUI), the GUI having a virtual search item to select the searching weight, wherein the virtual search item is configured to be adjusted by the user, and:

wherein in response to the query including the historical progression of author states, performing reverse correlation on the at least one of the data items associated with the historical progression; and displaying results of the query, the results of the query including data items that are associated with the at least one marker, wherein the data items are displayed in an order consistent with the searching weight for the at least one marker associated with each data item, the at least one marker including a symbol displayed adjacent to the data items, wherein the symbol indicates the state of the at least one author.

2. The method according to claim 1, wherein said associating of the markers with the data items is based on input manually entered into the interface by the at least one author.

3. The method according to claim 1, wherein said associating of the markers with the data items is automatically performed by the processor without input from the at least one author indicating the states of the at least one author.

4. The method according to claim 1, wherein the state of the at least one author is selected from a group consisting of GPS coordinates, a city, a street address, a name of a business, and a name selected by the user.

5. The method according to claim 1, wherein the state of the author includes a physiological state of the author.

6. The method according to claim 5, wherein the physiological state of the author is selected from the group consisting of body temperature, posture, limb configuration, muscle tone, muscle movement, respiration rate, measures of digestion, skin conductance, facial expression, EEG, EMG, pupil dilation, spasticity, spasmodicity, and heartrate.

7. The method according to claim 1, wherein the state of the author includes weather experienced by the author.

8. The method according to claim 1, wherein the state of the author includes a device type used by the author when the data item was accessed.

9. The method according to claim 1, wherein the state of the author includes a level of distraction.

10. The method according to claim 1, further including receiving a rating of a search result from the user, the rating indicating a retrospective accuracy assessment of the association of the marker with the search result.

11. The method according to claim 1, wherein the query includes at least one weighted coefficient for the at least one marker indicative of the state of the at least one author of the data item when the data item was accessed.

12. The method according to claim 1, further comprising receiving a rating from the user of at least one of the results of the query, wherein the rating indicating a retrospective accuracy assessment of the association of the marker with the at least one results of the query.

13. The method according to claim 1, wherein the at least one state is at least one bodily state, the at least one bodily state of the at least one author including locations of the at least one author's bodies when the data items were being accessed by the at least one author, the markers being automatically associated with the data items by a processor without input from the at least one author indicating the at least one bodily state of the at least one author.

14. The method according to claim 13, wherein the at least one bodily state of the at least one author is selected from a group consisting of GPS coordinates, a city, a street address, a name of a business, and a name of the bodily state selected by a user; or the at least one bodily state of the at least one author includes a mood of the author; or the at least one bodily state of the at least one author is selected from the group consisting of body temperature, posture, limb configuration, muscle tone, muscle movement, respiration rate, measures of digestion, skin conductance, facial expression, EEG, EMG, pupil dilation, spasticity, spasmodicity, and heartrate; or the at least one bodily state of the at least one author is selected from the group consisting of weather experienced by the author, a device type used by the author, and a level of distraction.

15. The method according to claim 13, wherein said associating of the markers with the data items includes associating a historical progression of author bodily states with at least one of the data items, and wherein said query includes the historical progression of author bodily states.

16. A method comprising:

receiving a query for a file classification from a user to be found in a file collection;

searching the file collection in response to the received query;

assembling a search result of the file collection to the user where the search result includes a list of files each having at least one marker, wherein the at least one marker includes at least one state of at least one individual associated with the respective file and at least one item of metadata, wherein the at least one state includes a mood of the at least one individual and the at least one item of metadata includes a time, a date, and a location in which each file in the list of files was created;

analyzing the at least one state and the at least one item of metadata for at least a largest variance in the at least one state and the at least one item of metadata associated with each file in the list of files;

applying the at least largest variance against the search result to locate at least two categories of files within the search result; and determining at least one commonality shared within each categoryof files by analyzing each state and each item of metadata associated with each file in the at least two categories of files to identify a shared aspect between all of the files in each category.

17. The method according to claim 16, further comprising adding the at least one commonality as a new state for each respective file; and wherein the file classification includes a file type assigned by at least one individual associated with the respective file.

18. A computer program product for ma naging data items, said computer program product comprising:

a computer readable storage medium having stored thereon:

first program instructions executable by a device to cause the device to associate markers with the data items, the markers indicating states of at least one author of the data items when the data items were being accessed by at least one author, wherein the markers are obtained from an operating system (OS) file descriptor table which aggregatesthe markersfrom a cloud, and wherein the associating of the markers with the data items includes associating a historical progression of author states with at least one of the data items;

second program instructions executable by the device to cause the device to receive a query for a data item from a user, the query including at least one marker indicative of a state of an author of the data item when the data item was being accessed by the at least one author, wherein the state of the author includes a mood of the author, wherein the user is able to select a searching weight for the at least one marker via a graphical user interface (GUI), the GUI having a virtual search item to select the searching weight, wherein the virtual search item is configured to be adjusted by the user, and:

wherein in response to the query including the historical progression of author states, performing reverse correlation on the at least one of the data items associated with the historical progression; and third program instructions executable by the device to cause the device to display results of the query, the results of the query including data items that are associated with the at least one marker, wherein the data items are displayed in an order consistent with the searching weight for the at least one marker associated with each data item, the at least one marker including a symbol displayed adjacent to the data items, wherein the symbol indicates the state of the at least one author.

* * * * *